US012803282B2

(12) United States Patent
Feng et al.

(10) Patent No.: US 12,803,282 B2
(45) Date of Patent: Nov. 17, 2026

(54) ADVANCED CONTROL AND RELATED METHODS FOR A LOW CARBON AMMONIA FACILITY

(71) Applicants: Zhentao Feng, Sugar Land, TX (US); Satish Bantwal Baliga, Katy, TX (US); Ekaterini Yamalidou, Houston, TX (US); Paolo Brunengo, Woking (GB); Rafal Bernat, Leatherhead Surrey (GB); Shoujun Bian, Pearland, TX (US)

(72) Inventors: Zhentao Feng, Sugar Land, TX (US); Satish Bantwal Baliga, Katy, TX (US); Ekaterini Yamalidou, Houston, TX (US); Paolo Brunengo, Woking (GB); Rafal Bernat, Leatherhead Surrey (GB); Shoujun Bian, Pearland, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 363 days.

(21) Appl. No.: 18/491,516

(22) Filed: Oct. 20, 2023

(65) Prior Publication Data

US 2024/0146058 A1 May 2, 2024

Related U.S. Application Data

(60) Provisional application No. 63/419,495, filed on Oct. 26, 2022.

(51) Int. Cl.

| | |
|---|---|
| ***H02J 3/00*** | (2006.01) |
| ***H02J 3/38*** | (2006.01) |
| *H02J 101/20* | (2026.01) |

(52) U.S. Cl.
CPC .............. *H02J 3/004* (2020.01); *H02J 3/381* (2013.01); *H02J 2101/20* (2026.01)

(58) Field of Classification Search
CPC ......... H02J 3/004; H02J 3/381; H02J 2101/20
(Continued)

(56) References Cited

U.S. PATENT DOCUMENTS 10,082,786 B2 9/2018 Sait et al.
11,626,730 B2 * 4/2023 Mehta ...................... G06N 3/09 700/287

(Continued)

FOREIGN PATENT DOCUMENTS

CN 113993816 A 1/2022
CN 114791542 7/2022

(Continued)

OTHER PUBLICATIONS

Zecevic "Energy Intensification of Steam Methane Reformer Furnace in Ammonia Production by Application of Digital Twin Concept." International Journal of Sustainable Energy, Mar. 3, 2021, vol. 41, No. 1, pp. 12-28.

(Continued)

*Primary Examiner* — Michael J Brown
(74) *Attorney, Agent, or Firm* — Gary Machetta

(57) ABSTRACT

Advanced control and related methods for a low carbon ammonia facility having an ammonia synthesis loop that includes systems to carry out the steps of supplying energy to the facility, wherein at least a portion of the supplied energy is from a low carbon energy source, receiving a forecasted energy profile for the low carbon energy source over a time period, predicting, using an advanced regulatory controller (ARC), the operating conditions of the facility based on the forecasted energy profile for the low carbon energy source, generating, by the ARC, one or more set (Continued)

points to control the facility; controlling the generating of the hydrogen feed using the ARC; and producing ammonia by feeding the generated hydrogen feed to the ammonia synthesis loop in accordance with one or more set points generated by the ARC.

20 Claims, 4 Drawing Sheets

(58) Field of Classification Search
USPC .......................................................... 700/291
See application file for complete search history.

(56) References Cited

U.S. PATENT DOCUMENTS

| | | | |
|---|---|---|---|
| 2019/0064757 | A1 | 2/2019 | Ramanurthy |
| 2019/0304318 | A1 | 10/2019 | Debonville et al. |
| 2022/0340419 | A1 | 10/2022 | Ravikumar et al. |
| 2023/0167564 | A1 | 6/2023 | Bonaquist et al. |
| 2023/0169224 | A1 | 6/2023 | Ramanasankaran et al. |
| 2024/0143854 | A1 | 5/2024 | Mehta et al. |
| 2024/0146058 | A1 | 5/2024 | Feng et al. |
| 2024/0409477 | A1 | 12/2024 | Woods et al. |
| 2025/0019848 | A1 | 1/2025 | Bagga et al. |

FOREIGN PATENT DOCUMENTS

| | | | |
|---|---|---|---|
| CN | 115840425 | A | 3/2023 |
| CN | 117585686 | A | 2/2024 |
| EP | 4181338 | A1 | 12/2023 |
| WO | 2023237500 | A1 | 12/2023 |

OTHER PUBLICATIONS

Zhang, et al. "Carbon Neutral Transformative Technologies for Industrial Process." Bulletin of Chinese Academy of Sciences, Apr. 20, 2022, vol. 37, Issue 4 (12 pages).

Patent Cooperation Treaty, International Searching Authority, International Search Report and Written Opinion dated May 1, 2024 for International Application No. PCT/US2023/077450 filed Oct. 20, 2023 (19 pages).

* cited by examiner

ADVANCED CONTROL AND RELATED METHODS FOR A LOW CARBON AMMONIA FACILITY

CROSS-REFERENCE TO RELATED APPLICATIONS

This application claims the benefit of U.S. Provisional Application No. 63/419,495, filed Oct. 26, 2022, the contents of which are incorporated herein by reference in their entirety.

TECHNICAL FIELD

The present disclosure relates to advanced control and related methods for a low carbon ammonia facility.

BACKGROUND

Conventionally, ammonia is produced by reacting hydrogen with nitrogen in the presence of a catalyst. A hydrocarbon feedstock is usually used to generate the hydrogen feed for the process. Proposals to eliminate the hydrocarbon feedstock and decarbonize ammonia production sometimes employ alternative hydrogen sources such as an electrolyzer/electrolysis process, which only requires water and electricity. If a renewable energy source supplies the electricity for the electrolyzer, then hydrogen for ammonia production can be generated without carbon emissions. However, because efficient ammonia production requires steady-state conditions such as invariant flowrate for the hydrogen feed, using renewable energy sources can be problematic when operating an electrochemical system such as an electrolyzer.

Renewable energy sources, such as wind or solar power, are prone to changes in environmental conditions; e.g., lulls in winds, inclement weather, etc. A reduction in wind speed or sunlight intensity can lead to reductions in available electrical power. Reduced electrical power, in turn, causes the hydrogen production source (e.g., electrolyzer) to generate less hydrogen feed, which can limit ammonia production.

The present disclosure addresses the need for efficient low carbon ammonia production utilizing renewable energy sources. The present disclosure also addresses the need for systems and methods that allow a dynamic energy source, such as renewable energy, to provide energy to any process whose stability is affected by a dynamic energy supply.

SUMMARY

In aspects, the present disclosure provides advanced control and related methods for a low carbon ammonia facility that may address one or more problems of the prior art. In examples, the low carbon ammonia facility may include an ammonia synthesis loop.

In examples, provided is a method for producing ammonia using a low carbon energy source, the ammonia being produced by a facility having an ammonia synthesis loop, the method including supplying energy to the facility, wherein at least a portion of the supplied energy may be from a low carbon energy source; receiving a forecasted energy profile for the low carbon energy source over a time period; predicting, using an advanced regulatory controller (ARC), the operating conditions of the facility based on the forecasted energy profile for the low carbon energy source; generating, by the ARC, one or more set points to control the facility; generating a hydrogen feed to the ammonia synthesis loop using at least one of: (i) a primary hydrogen feed generated by a hydrogen plant energized by the low carbon energy source, and (ii) a supplemental hydrogen feed; controlling the generating of the hydrogen feed using the ARC; and producing ammonia by feeding the generated hydrogen feed to the ammonia synthesis loop in accordance with one or more set points generated by the ARC.

In examples, generating the hydrogen feed may include using the supplemental hydrogen feed provided from: (i) a hydrogen storage unit energized by the low carbon energy source, (ii) a secondary hydrogen source, or (iii) a combination of (i) and (ii).

In examples, one or more set points for the facility may be generated using facility-specific information and non-facility-specific information, the non-facility-specific information including the forecasted energy profile for the low carbon energy source.

In examples, the non-facility-specific information may include availability of energy from a secondary energy source, and the method may include transferring energy between the facility and the secondary energy source. In examples, the transferring may include (i) exporting energy from the low carbon energy source to the secondary energy source, and/or (ii) importing energy from the secondary energy source to the facility.

In examples, the forecasted energy profile for the low carbon energy source may be received continuously or periodically. In examples, one or more set points may be generated by the ARC each time an update to the energy profile for the low carbon energy source is received.

In examples, the method may include determining if the predicted operating conditions of the facility are outside the operating limits of one or more sections or equipment of the facility.

In examples, generating one or more set points for the facility may include determining that the predicted operating conditions of the facility are outside the operating limits of one or more sections or equipment of the facility; determining, in response to the determination that the predicted operating conditions are outside the operating limits, a maximum hydrogen rate that may be consumed by the ammonia synthesis loop without violating any of the operating limits of any equipment and/or process in the facility; and generating one or more set points for the facility based on the determined maximum hydrogen rate and on the operating limits of one or more sections or equipment of the facility.

In examples, provided is a control system for producing ammonia using a low carbon energy source, the ammonia being produced by a facility having an ammonia synthesis loop, the control system including an advanced regulatory controller (ARC) configured to receive a forecasted energy profile for the low carbon energy source over a time period; predict operating conditions of the facility based on the forecasted energy profile for the low carbon energy source; and generate one or more set points for the facility and to control a generation of a hydrogen feed to the ammonia synthesis loop for production of the ammonia.

In examples, one or more set points may be generated based on the received forecasted energy profile for the low carbon energy source.

In examples, the ARC may be configured to receive a level of energy availability from a secondary energy source.

In examples, the ARC may be configured to cause a transfer of energy between the facility and the secondary energy source.

In examples, the ARC may be configured to determine if the predicted operating conditions of the facility are outside the operating limits of one or more sections or equipment of the facility; determine, in response to the determination that the predicted operating conditions of the facility are outside the operating limits, a maximum hydrogen rate that may be consumed by the ammonia synthesis loop without violating any of the operating limits of any equipment and/or process in the facility; and use the maximum hydrogen rate and on the operating limits of one or more sections or equipment of the facility to generate one or more set points.

In examples, the control system may include one or more distributed control systems configured to receive one or more set points generated by the ARC.

In examples, provided is a non-transitory computer readable medium having stored thereon computer-readable instructions that, when executed by a processor, cause the processor to receive facility-specific information and non-facility-specific information, wherein the non-facility-specific information may include a forecasted energy profile for a low carbon energy source over a time period; predict the operating conditions of the facility based on the forecasted energy profile for the low carbon energy source; determine if the predicted operating conditions of the facility are outside the operating limits of one or more sections or equipment of the facility; generate, based on the determination, one or more set points for the facility; and control production of ammonia based on one or more set points.

In examples, the non-transitory computer readable medium may be configured to continuously monitor one or more components of a facility that includes the ammonia synthesis loop and the low carbon energy source.

In examples, the non-transitory computer readable medium may be configured to receive a level of energy availability from a secondary energy source.

In examples, the non-transitory computer readable medium may be configured to cause a transfer of energy from the low carbon energy source to a secondary source of energy.

In examples, provided is a method for controlling a facility for producing ammonia using a low carbon energy source and an ammonia synthesis loop, including: receiving facility-specific information and non-facility-specific information, wherein the non-facility-specific information may include a forecasted energy profile for a low carbon energy source over a time period; predicting the operating conditions of the facility based on the forecasted energy profile for the low carbon energy source; determining if the predicted operating conditions of the facility are outside the operating limits of one or more sections or equipment of the facility; generating, based on the determination, one or more set points for the facility; and controlling production of ammonia based on one or more set points.

It should be understood that certain features of the disclosure have been summarized rather broadly in order that the detailed description thereof that follows may be better understood, and in order that the contributions to the art may be appreciated. There are, of course, additional features of the disclosure that will be described hereinafter and which will in some cases form the subject of the claims appended thereto.

BRIEF DESCRIPTION OF THE DRAWINGS

For detailed understanding of the present disclosure, references should be made to the following detailed description taken in conjunction with the accompanying drawings, in which like elements have been given like numerals and wherein.

DETAILED DESCRIPTION

Figure 1:
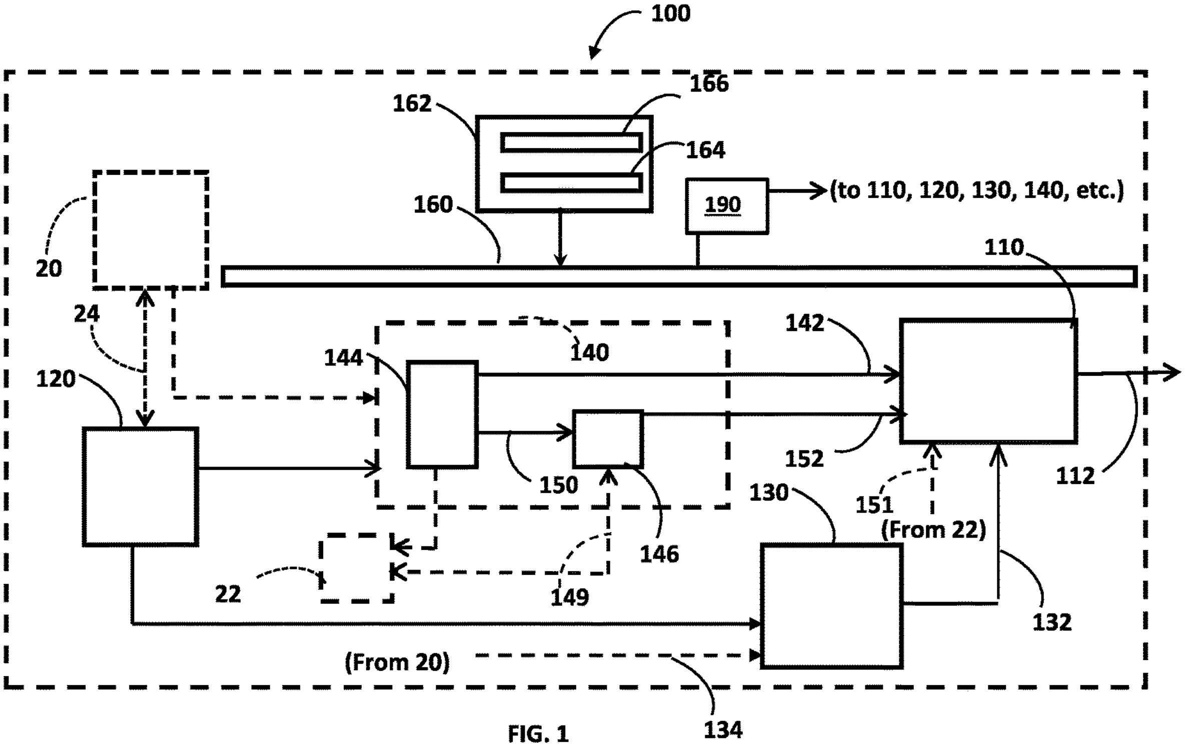
FIG. 1 schematically illustrates a low carbon process for synthesizing ammonia using a low carbon energy source in accordance with one embodiment of the present disclosure.

In aspects, the present disclosure provides systems and related methods for advanced control and related methods for a low carbon ammonia facility. There are shown in the drawings, and herein will be described in detail, specific embodiments of the present disclosure with the understanding that the present disclosure is to be considered an exemplification of the principles of the disclosure and is not intended to limit the disclosure to that illustrated and described herein.

Referring to FIG. 1, there is schematically shown a non-limiting embodiment of a low carbon ammonia production facility 100, hereafter 'facility 100,' in accordance with the present disclosure. Facility 100 includes an ammonia synthesis loop 110 that produces an ammonia product 112. To reduce or eliminate carbon emissions, a low carbon energy source 120 may be used to supply electrical energy to one or more components of the facility 100. Because the power output of the low carbon energy source 120 may fluctuate due to external influences, such as weather conditions, the supply of power from the low carbon energy source 120 may encounter prolonged interruptions or be subject to diminished capacity. With the benefit of the present teachings, such low carbon energy sources 120 may still be used to supply energy to the facility 100. Accordingly, it is emphasized that terms such as "supplying power" or "supplying energy" does not require an uninterrupted supply or power having any specified minimum requirements.

The ammonia synthesis loop 110 may receive a nitrogen feed 132 from a nitrogen source 130 and a direct hydrogen feed 142 directly from a primary hydrogen source 144. The nitrogen source 130 may be a conventional air separator unit that may be powered by the low carbon energy source 120 and/or from a secondary energy source 20 (e.g., a power grid). The secondary energy source 20 is operationally independent of facility 100. That is, the secondary energy source 20 is not controlled by or dependent on facility 100.

In examples, the facility 100 includes a hydrogen plant 140. In examples, the hydrogen plant 140 generates the direct hydrogen feed 142 using a low carbon process. Electricity for the process is supplied by the low carbon energy source 120. In one arrangement, the hydrogen plant 140 includes a primary hydrogen source 144 and a hydrogen storage unit 146. In one embodiment, the primary hydrogen source 144 may be an electrolyzer. In examples, the primary hydrogen source 144 may include an electrolyzer that generates a hydrogen feed that may include a direct hydrogen feed 142 to the ammonia synthesis loop 110 and/or a storage hydrogen feed 150 to the hydrogen storage unit 146. The direct hydrogen feed 142 and the storage hydrogen feed 150 are shown as separate merely for clarity. A common effluent line (not shown) from the electrolyzer used as primary hydrogen source 144 may be used to selectively direct flow to either or both of the ammonia synthesis loop 110 and hydrogen storage unit 146. It should be noted that the present teachings are not limited to a hydrogen plant 140 that uses only an electrolyzer as primary hydrogen source 144 to generate the hydrogen feed. The present teachings are equally applicable to any system or method of generating hydrogen via a low carbon process.

The hydrogen storage unit 146 provides a supplemental hydrogen feed for the ammonia synthesis loop 110. In one arrangement, the hydrogen storage unit 146 stores hydrogen and supplies the stored hydrogen feed 152 to the ammonia synthesis loop 110, if needed. Valves (not shown) can control the storage hydrogen feed 150 from the primary hydrogen source 144, such as an electrolyzer, to the hydrogen storage unit 146. Valves (not shown) can also control the stored hydrogen feed 152 from the hydrogen storage unit 146 to the ammonia synthesis loop 110. In some embodiments, the hydrogen storage unit 146 may be supplied by a secondary hydrogen source 22 via a secondary hydrogen feed 149. Also, excess hydrogen from the hydrogen storage unit 146 may be exported to the secondary hydrogen source 22. The secondary hydrogen source 22 may also provide a supplemental hydrogen feed to the ammonia synthesis loop 110. For example, hydrogen can be supplied to the ammonia synthesis loop 110 directly from the secondary hydrogen source 22 via the direct secondary hydrogen feed 151. As used herein, a "secondary hydrogen source" is a hydrogen source that is operationally independent of facility 100. That is, the secondary hydrogen source has access to sources for receiving power and hydrogen that are independent of facility 100.

Facility 100 also includes an advanced regulatory controller (hereafter, 'ARC') 160 that determines one or more set points 190 for controlling one or more operations of facility 100. The ARC 160 may determine the set point(s) 190 for facility 100, based on forecasted energy profile for the low carbon energy source 120 over a time period and/or the energy availability from the secondary energy source 20. In examples, the time period may be a selected or preselected time period. In examples, the forecasted energy profile for the low carbon energy source 120 may be provided by the operator of the low carbon energy source 120, for example the operator of the solar farm, wind farm, tidal power plant, geothermal power plant, hydroelectric power plant, nuclear power plant, or hydrogen pipeline. In examples, the energy availability from the secondary energy source 20 may be provided by the operator of the secondary energy source 20. As used herein, a 'set point' is a value associated with a desired output, response, behavior, or operating state of a process component. A set point may be a value, range of values, an upper limit or a lower limit. By 'control,' it is meant modulating, stopping, starting, adjusting, increasing, decreasing, and/or maintaining one or more states, conditions, and/or parameters relating to a given operation. As further described below, the set point(s) 190 are transmitted to the distributed control systems (hereafter 'DCS') 180 of the facility 100.

The ARC 160 may include logic, computations, algorithms, schemas, microprocessors, memory modules, bi-directional signal transmission devices, display devices, input devices, and other components suitable for receiving, processing, storing, and transmitting information.

The ARC 160 determines the set points 190 using information 162, which may include facility-specific information 164 and/or non-facility-specific information 166. Facility-specific information 164, which is information relevant to the operation of facility 100, may include operating parameters and conditions of the equipment or components of the facility 100, as well as current set points of the primary hydrogen source 144 (e.g. an electrolyzer), nitrogen source 130, hydrogen storage unit 146, ammonia synthesis loop 110 and/or other component(s) associated with facility 100. Facility-specific information 164 may also include operating parameters such as pressure, temperature, flow rates, energy usage, etc. of one or more components of the facility 100. The non-facility-specific information 166, which is information external to the operation of facility 100, may include information relating to the availability and demand of external resources, and other information that is independent of the operation of the facility 100. In examples, non-facility-specific information 166 may include the forecasted profile of energy for the low carbon energy source over a given period of time, availability of secondary energy source 20, availability of secondary hydrogen source 22, etc. It should be noted that the facility-specific information and the non-facility-specific information described above are only illustrative. The design and configuration of a facility 100, the geographical location in which the facility 100 is located, and the infrastructure in the vicinity of the facility 100 may require facility-specific information and/or non-facility-specific information that are not expressly listed above.

The ARC 160 may be designed and configured to receive as an input the forecasted energy profile for the low carbon energy source 120 over a time period, which is the amount of energy available to facility 100 over the given period of time. The forecasted energy profile for the low carbon energy source 120 may be obtained from the operator of the low carbon energy source 120, for example the operator of the solar farm, wind farm, tidal power plant, geothermal power plant, hydroelectric power plant, nuclear power plant, or hydrogen pipeline. The forecasted energy profile for the low carbon energy source 120 over a time period is then used to determine one or more set points 190 of facility 100.

Illustrative, but not exhaustive, changes that may be made/recommended by the ARC 160 include increasing or decreasing the flow of hydrogen from the primary hydrogen source 144 (e.g. an electrolyzer) to the hydrogen storage unit 146, increasing or decreasing the flow of hydrogen from the primary hydrogen source 144 (e.g. an electrolyzer) to the ammonia synthesis loop 110, and/or increasing or decreasing the flow of hydrogen from the hydrogen storage unit 146 to the ammonia synthesis loop 110.

The ARC 160 may establish the target set points 190 for facility 100 aiming to keep the ammonia synthesis loop operating in a stable manner, even when the forecasted energy profile for the low carbon energy source 120 shows high degree of variability over a period of time. When establishing the target set points 190, the ARC 160 may take into account one or more of facility-specific information 164 such as the minimum power requirements for the operation of all equipment of facility 100, the operating limits of all equipment of facility 100, including the allowable rate of change and the minimum turndown ratio of the ammonia synthesis loop 110, and the availability of hydrogen in the hydrogen storage unit 146. When establishing the target set points 190, the ARC 160 may also take into account one or more of non-facility-specific information 166, such as the availability of power from the secondary energy source 20, the availability of hydrogen from the direct secondary hydrogen feed 149 and the requirements for the ammonia product 112.

The ARC 160 may receive the forecasted energy profile for the low carbon energy source 120 over a period of time, for example the next six hours and then the ARC 160 may calculate the cumulative availability of energy over the same time period.

The ARC 160 may perform first principles calculations related to the operation of each equipment of facility 100 to determine the expected energy consumption based on the current operating conditions over the period of time equal to the length of the forecasted energy profile for the low carbon energy source 120. This calculation may be performed continuously and/or at predetermined time intervals, for example hourly, as well as each time the ARC 160 may receive an updated forecasted energy profile for the low carbon energy source 120. The ARC 160 may perform the calculations in steps, as illustrated below.

Figure 4:
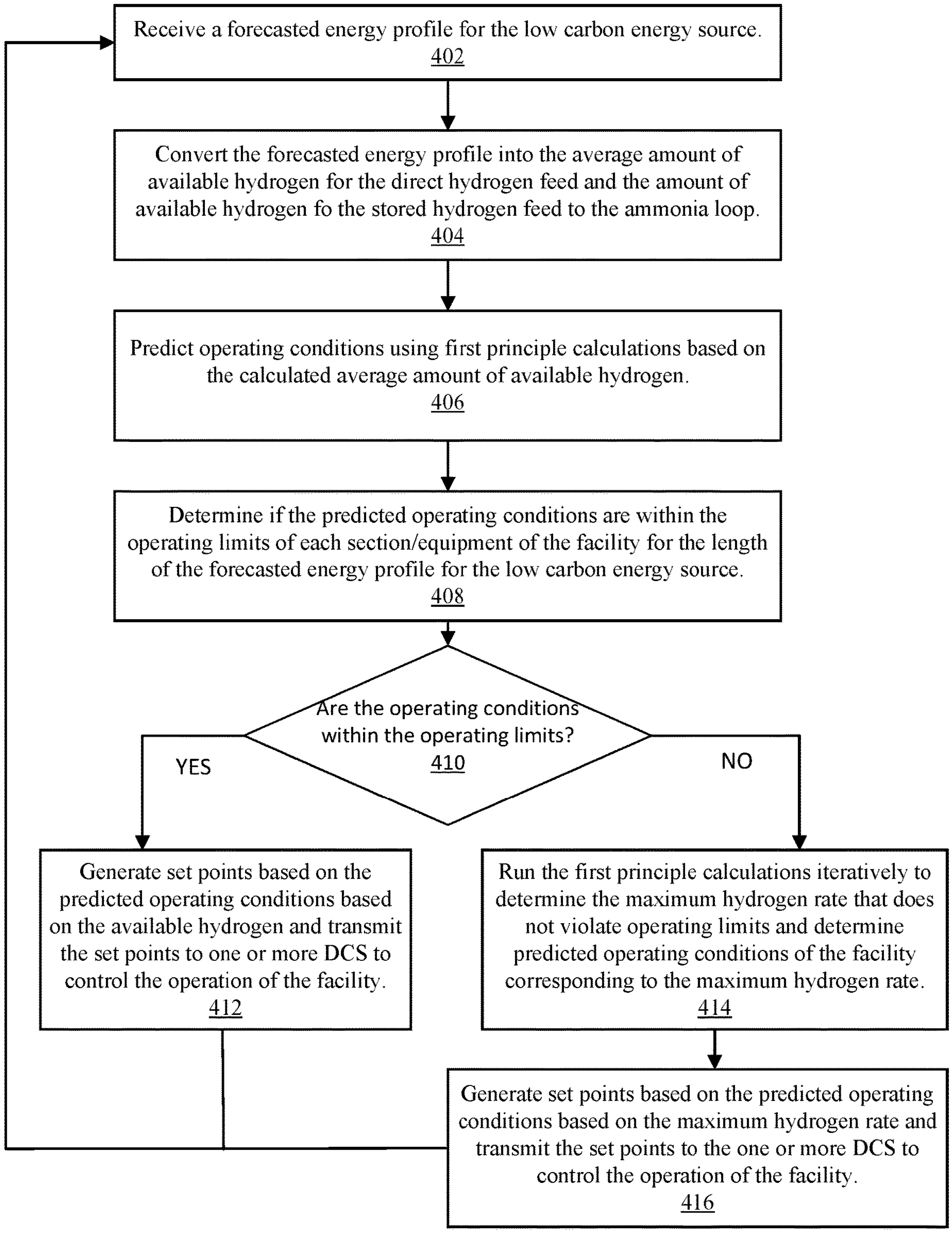
FIG. 4 illustrates a flow diagram of an example of the computation process of the ARC as described herein.

As shown, for example in FIG. 4, at the start of the process, at 402, the ARC receives a forecasted energy profile for the low carbon energy source. After receipt of the forecasted energy profile, at 404 (step 1) the ARC 160 may convert the forecasted energy profile for the low carbon energy source 120 into the average amount of available hydrogen for the direct hydrogen feed 142 and the amount of available hydrogen of the stored hydrogen feed 152 to the ammonia synthesis loop 110. The conversion takes into consideration the expected performance of the primary hydrogen source 144 (e.g. an electrolyzer), the power consumption by the ammonia synthesis loop 110, the nitrogen source 130 and other parts of the plant, for example the hydrogen storage unit 146, etc.

At 406 (step 2) the calculated average amount of available hydrogen may be used as an input to the first principles calculations. The first principles calculations may predict the operating conditions of the ammonia synthesis loop 110, the primary hydrogen source 144 (e.g. an electrolyzer), the nitrogen source 130 and other parts of the plant, for example the hydrogen storage unit 146, etc. corresponding to the calculated average hydrogen target for the entire period of the length of the forecasted energy profile for the low carbon energy source 120.

At 408 and 410 (step 3) the ARC 160 may determine if the operating conditions predicted at step 2 are within the operating limits of each section of facility 100 and within the operating limits of each equipment for the length of the forecasted energy profile for the low carbon energy source 120. Operating limits of each section and/or equipment of facility 100 may be design operating limits set when the facility 100 and/or equipment is designed and/or installed or operating limits defined by the original equipment manufacturer. If the predicted operating conditions are within all operating limits, the ARC 160 may use these operating conditions, which have been validated by the first principles calculations and may define all the set points 190 for facility 100.

At 412 (step 4), the ARC 160 may transmit the set points 190 to the DCS 180 to control the operation of facility 100 at the desired target levels.

In step 5, if any of the operating conditions predicted in step 2 are outside the operating limits listed in step 3, then at 414 the ARC 160 may run the first principles calculations iteratively with the purpose to determine the maximum hydrogen rate, which may be consumed by the ammonia synthesis loop 110 without violating any of the operating limits of any equipment in the plant. For example, the ARC 160 may try different values for the hydrogen rate taking into account the forecasted available energy for the low carbon energy source 120. For each of these hydrogen rate values the ARC 160 may determine the operating conditions of facility 100 and select the maximum hydrogen rate that results in desired level of operation of facility 100, which is within the operating limits. At 416, the ARC 160 may use the newly determined maximum hydrogen rate and the predicted operating conditions corresponding to the maximum hydrogen rate to define the set points 190 for facility 100.

In step 6, an updated forecasted energy profile for the low carbon energy source may be available and the process including the calculation from step 1 to step 5 may loop back and be repeated as shown in FIG. 4. In examples, the calculations from step 1 to step 5 may be repeated at the same frequency as the frequency of the availability of the energy profile for the low or zero carbon energy source 120.

In between the updates of the forecasted energy profile for the low or zero carbon energy source 120, the ARC 160 may monitor continuously the plant conditions and perform the first principle calculations described in steps 1 through 6, in order to determine how it may adjust the set points 190 of facility 100, based on the dynamic relationships between the process variables and the set points 190, such that no process conditions will violate the allowable limits. This dynamic relationship may be established based on the first principles calculations related to the facility 100 or by performing perturbation tests on the operation of facility 100, for example changing the rate of the direct hydrogen feed 142 to the ammonia synthesis loop 110 and measuring the impact on the pressure of the hydrogen storage unit 146.

The ARC 160 may be configured to autonomously transmit the set points 190 to the DCS 180. Alternatively, the ARC 160 may be configured to display 'prompts' to a human operator, who will then implement the controls. Of course, the ARC 160 may also be configured to operate in a semi-autonomous fashion in which some controls are executed autonomously and others are done by a human operator.

As noted above, a secondary energy source 20 may be used in some situations. The secondary energy source 20 may include an electrical grid. It should be noted that any surplus electricity generated by the low carbon energy source 120 may be fed into the electrical grid through energy connection 24. The secondary energy source 20 may also include a battery bank that is charged by the low carbon energy source 120 and/or the electrical grid through energy connection 24. As noted above, a secondary hydrogen source 22 may be used in some situations. When present, the secondary hydrogen source 22 may provide a supplemental hydrogen feed to the ammonia synthesis loop 110. This supplemental hydrogen feed may be in place of or in addition to the supplemental hydrogen feed provided by the stored hydrogen feed 152 from the hydrogen storage unit 146. It should be noted that any surplus hydrogen generated by the primary hydrogen source 144 (e.g. an electrolyzer), or other hydrogen producing equipment, may be fed into the secondary hydrogen source 22 through the secondary hydrogen feed 149 or some other fluid line.

Figure 2:
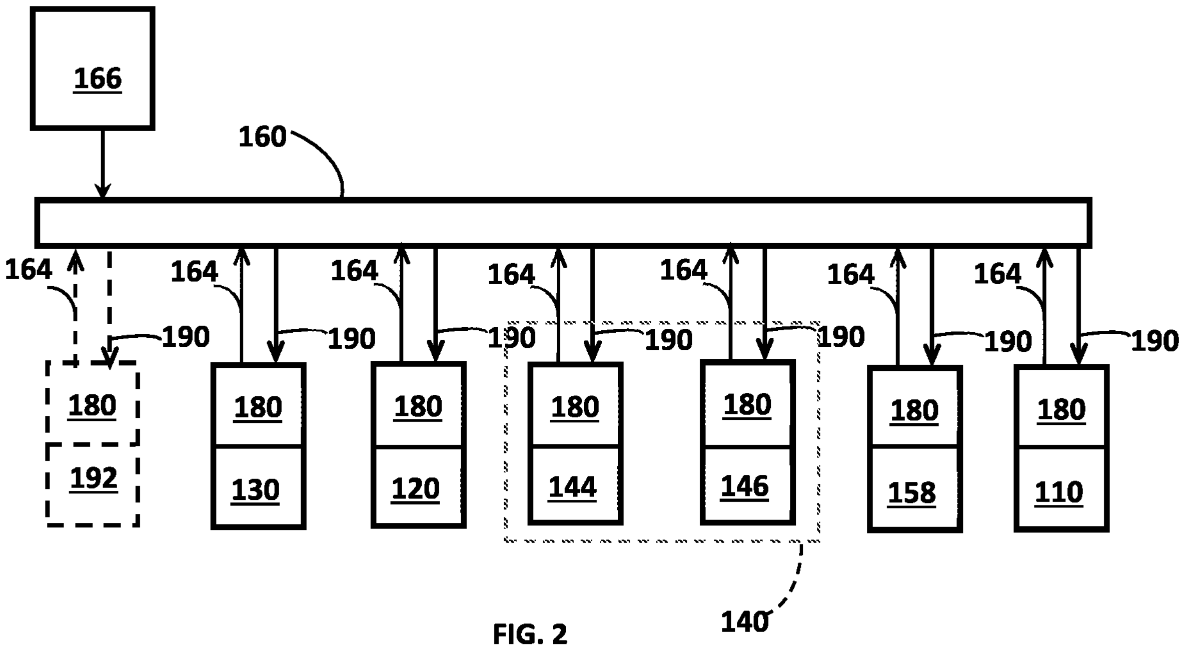
FIG. 2 schematically illustrates an advanced regulatory controller (ARC) in accordance with one embodiment of the present disclosure configured to control an ammonia synthesis facility that uses a low carbon energy source.

Referring to FIG. 2, there is schematically illustrated a non-limiting embodiment of an ARC 160 in accordance with the present disclosure. The ARC 160 may be used to control various functions of facility 100, including an ammonia synthesis loop 110, a low carbon energy source 120, a nitrogen source 130, a hydrogen plant 140, and a valve network 158. The hydrogen plant 140 includes a primary hydrogen source 144 (e.g. an electrolyzer) and a hydrogen storage unit 146. The valve network 158 controls the distribution of hydrogen generated by the primary hydrogen source 144 (e.g. an electrolyzer). The valves 158, and associated signal lines, selectively direct the direct hydrogen feed 142 (FIG. 1) to the ammonia synthesis loop 110 and storage hydrogen feed 150 (FIG. 1) to the hydrogen storage unit 146.

Each above-listed component includes a DCS 180 that includes logic and hardware designed and configured to control the associated component. Each DCS 180 is also designed and configured to receive and execute one or more set points 190 received from the ARC 160 for the associated component. While all of the DCS 180 are labelled with the same numeral, it should be understood that each DCS 180 may be programmed specifically for the associated component.

The ARC 160 controls one or more operations of facility 100 (FIG. 1) by sending command signals in the form of determined set points 190 to one or more DCS 180. The ARC 160 determines the set point(s) 190 using non-facility-specific information 166 related to the energy profile for the low carbon energy source 120 and/or the energy availability from the secondary energy source 20 (FIG. 1) over a time period. The ARC 160 also receives facility-specific information 164 from one or more of the DCS 180. The facility-specific information 164 may relate to operating parameters discussed previously. Based on the non-facility-specific information 166 and the facility-specific information 164, the ARC 160 generates set point(s) 190 for facility 100 and/or components of facility 100. In examples, the generated set point(s) 190 are transmitted to one or more DCS 180, which control facility 100 and/or components of facility 100.

As shown in FIG. 2, the set point(s) 190 may be transmitted as needed to one or more DCS 180 of the ammonia synthesis loop 110, the low carbon energy source 120, the nitrogen source 130, the primary hydrogen source 144 (e.g. an electrolyzer), the valves 158, and the hydrogen storage unit 146. In examples, facility 100 may include other equipment. In such instances, the ARC 160 may send set points to one or more DCS 180 of such equipment. Such other equipment 192 and the associated DCS 180 are shown in hidden lines.

In one non-limiting example of operation, as the ARC 160 continuously and/or periodically calculates the energy needs of the entire operation of facility 100, based on facility-specific information 164 and the non-facility-specific information 166, the ARC 160 may determine that the energy profile for the low carbon energy source 120 cannot sustain the operation of the ammonia synthesis loop 110 over a period of time. As explained previously, a reduction in electrical energy causes a corresponding reduction in hydrogen production. To mitigate the effect of the loss of available hydrogen, the ARC 160 may utilize the stored hydrogen in the hydrogen storage unit 146. For instance, the ARC 160 may transmit a set point 190 to the DCS 180 associated with the valve network 158 to supplement the direct hydrogen feed 142 (FIG. 1) entering the ammonia synthesis loop 110 with the stored hydrogen feed 152 (FIG. 1) to compensate for the loss of generated hydrogen. If the amount of stored hydrogen is sufficient to maintain the current flow rate of the direct hydrogen feed 142 (FIG. 1) during the disruption in electricity availability, then the ARC 160 may take no further action.

If the amount of stored hydrogen is insufficient to maintain the desired flow rate of the direct hydrogen feed 142 (FIG. 1) during the disruption, then the ARC 160 may determine a course of action that achieves the operating conditions that optimize ammonia production. An exemplary course of action may be to estimate a desirable hydrogen and nitrogen flowrate ratio given the predicted amount of available hydrogen. The ARC 160 may then send set point(s) 190 to the DCS 180 (FIG. 2) of facility 100. The set point(s) 190 may periodically or continuously adjust set points at the DCS 180.

In another non-limiting example of operation, the ARC 160 may process the non-facility-specific information 166 and determine no loss of electrical energy availability over a period of time. With no expected need for stored hydrogen, the ARC 160 may control the valves 158 to direct all hydrogen generated by the primary hydrogen source 144 (e.g. an electrolyzer) to the ammonia synthesis loop 110. Thus, energy is not wasted compressing hydrogen for storage.

It should be appreciated that the ARC 160 may also be designed and configured to generate the set points 190 for facility 100 that cause one or more of: (i) send and/or transfer surplus electricity generated by the low carbon energy source 120 to the secondary energy source 20 (FIG. 1) via the energy connection 24 (FIG. 1); (ii) direct a supplemental hydrogen feed from the secondary hydrogen source 22 (FIG. 1) to the ammonia synthesis loop 110; and (iii) send and/or transfer surplus hydrogen generated by the hydrogen plant 140 to the secondary hydrogen source 22 (FIG. 1) via the secondary hydrogen feed 149 (FIG. 1) or some other fluid line.

Figure 3:
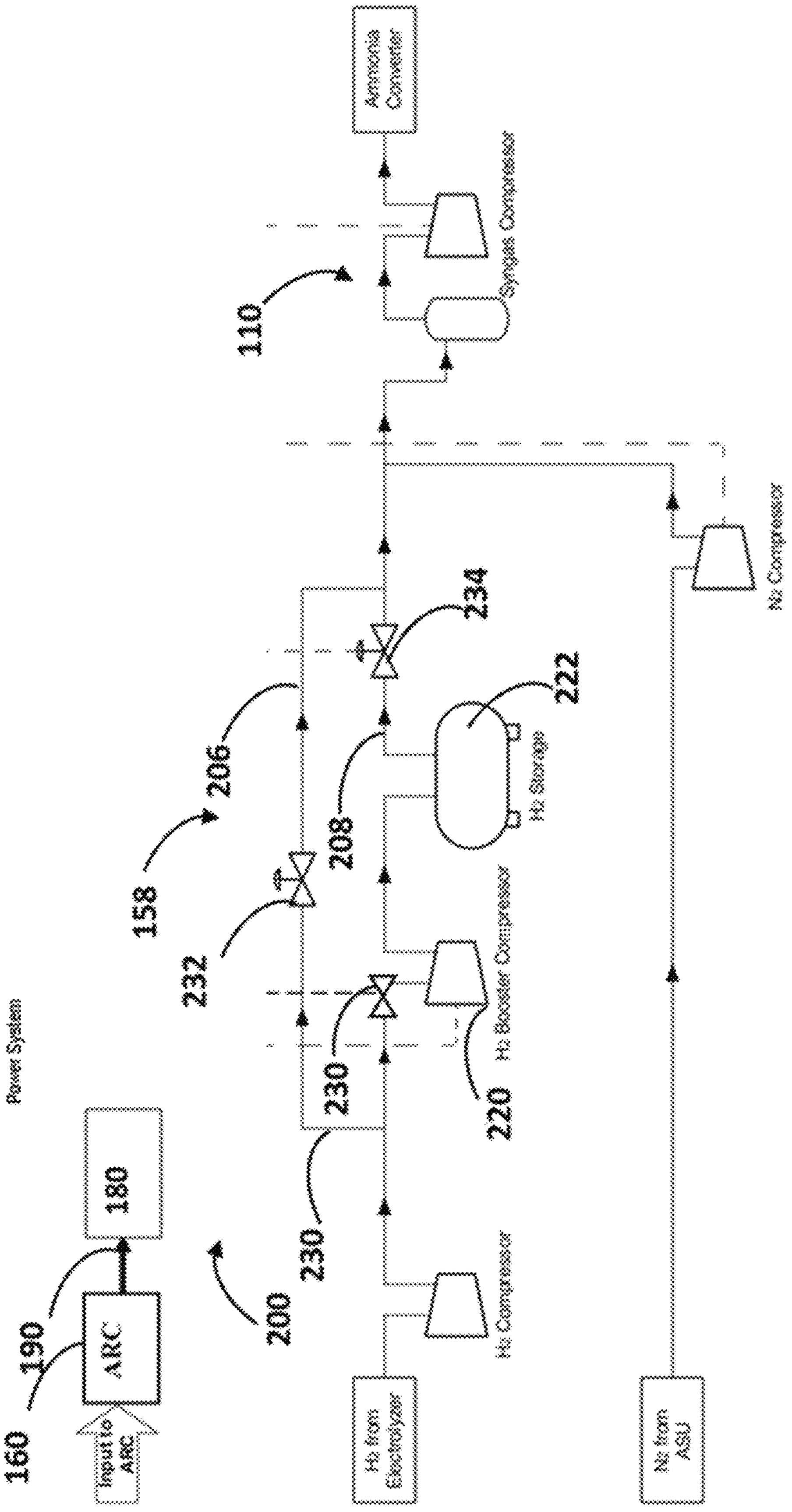
FIG. 3 schematically illustrates a valve system for a hydrogen source used in the FIG. 1 embodiment.

Referring to FIG. 3, there is schematically illustrated a non-limiting embodiment of a hydrogen flow line assembly 200 in accordance with the present disclosure. The hydrogen flow line assembly 200 may be configured to selectively direct flow to the ammonia synthesis loop 110 and/or the hydrogen storage unit 146. The hydrogen storage unit 146 may include a compressor 220 and a tank 222. The valve network 158 may include a flow controller 230 controlling flow into the compressor 220, a bypass flow controller 232 controlling flow along a bypass line 206, and a hydrogen makeup flow controller 234 controlling flow out of the tank 222 along a hydrogen makeup line 208. The flow controllers 230, 232, 234 are controlled by associated DCS 180.

It should be appreciated that electrical energy produced by the low carbon energy source 120 may be in excess of what is required by facility 100. In such instances, the excess energy may be sent to an outside consumer, e.g., utility grid. Likewise, hydrogen produced by the hydrogen plant 140 in excess of what is required by facility 100. In such instances, the excess hydrogen may be sent to an outside hydrogen consumer.

In examples, although not shown, one or more control systems such as, but not limited to, ARC 160 and DCS 180, may each independently include one or more controllers and/or other suitable computing devices may be employed to control one or more of portions of systems described herein. Controllers may include one or more processors and memory communicatively coupled with each other. In the illustrated example, a memory may be used to store logic instructions to operate and/or control and/or monitor the operation of one or more sections and/or equipment or components of facility 100. In examples, the controllers may include or be coupled to input/output devices such as monitors, keyboards, speakers, microphones, computer mouse and the like. In examples, one or more controllers may also include one or more communication components such as transceivers or like structure to enable wired and/or wireless communication. In examples, this may allow for remote operation of one or more systems described herein.

In examples, memory associated with one or more controllers and/or other suitable computing devices may be non-transitory computer-readable media. The memory may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The controls systems may include any number of logical, programmatic, and physical components.

Logic instructions may include one or more software modules and/or other sufficient information for autonomous operation, safety procedures, and routine maintenance processes. Any operation of the described system may be implemented in hardware, software, or a combination thereof. In the context of software, operations represent computer-executable instructions stored on one or more computer-readable storage media that, when executed by one or more processors, perform the recited operations. Generally, computer-executable instructions include routines, programs, objects, components, data structures, and the like that perform one or more functions or implement particular abstract data types.

It should be noted that the equipment, devices, components, and systems described above are only exemplary of the equipment, devices, components, and systems designed and configured to perform their respective tasks. For example, an electrolyzer is only one example of a device that may be used to generate hydrogen. Other hydrogen sources may utilize renewable liquid reforming, high-temperature water-splitting, photobiological water splitting, photoelectrochemical water splitting, etc. Thus, the present teachings are neither limited to the equipment, devices, components, and systems described above nor the processes used therein.

As used herein, the term "low carbon energy" refers to an energy source that does not use hydrocarbons as the principal source of energy. Examples of low carbon power sources include, but are not limited to, solar power, wind power, tidal power, geothermal power, hydroelectric power, nuclear power, and hydrogen pipeline. It should be noted that the term "low carbon energy" source encompasses power sources that do not emit any carbon, i.e., "a zero carbon energy source."

The words "comprising" and "comprises" as used throughout the claims, are to be interpreted to mean "including but not limited to" and "includes but not limited to", respectively.

To the extent used herein, the word "substantially" shall mean "being largely but not wholly that which is specified."

As used herein, the singular forms "a," "an," and "the" are intended to include the plural forms as well, unless the context clearly indicates otherwise.

To the extent used herein, the term "about" in reference to a given parameter is inclusive of the stated value and has the meaning dictated by the context (e.g., it includes the degree of error associated with measurement of the given parameter).

To the extent used herein, the term "and/or" includes any and all combinations of one or more of the associated listed items.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure. It is intended that the following claims be interpreted to embrace all such modifications and changes.

What is claimed is:

1. A method for producing ammonia using a low carbon energy source, the ammonia being produced by a facility having an ammonia synthesis loop, the method comprising:

supplying energy to the facility, wherein at least a portion of the supplied energy is from a low carbon energy source;

receiving a forecasted energy profile for the low carbon energy source over a time period;

predicting, using an advanced regulatory controller (ARC), operating conditions of the facility based on the forecasted energy profile for the low carbon energy source by determining an average amount of available hydrogen over the time period of the forecasted energy profile, and determining the operating conditions of the facility via first principle calculations based on the average amount of available hydrogen;

generating, by the ARC, one or more set points to control the facility based on the operating conditions predicted based on the forecasted energy profile, wherein the one or more set points control the facility to operate within operating limits of the facility;

generating a hydrogen feed to the ammonia synthesis loop using at least one of:

(i) a primary hydrogen feed generated by a hydrogen plant energized by the low carbon energy source, and (ii) a supplemental hydrogen feed;

controlling the generating of the hydrogen feed using the ARC; and producing ammonia by feeding the generated hydrogen feed to the ammonia synthesis loop in accordance with the one or more set points generated by the ARC.

2. The method of claim 1, wherein generating the hydrogen feed comprises using the supplemental hydrogen feed provided from: (i) a hydrogen storage unit energized by the low carbon energy source, (ii) a secondary hydrogen source, or (iii) a combination of (i) and (ii).

3. The method of claim 1, wherein the one or more set points for the facility are generated using facility-specific information and non-facility-specific information, the non-facility-specific information comprising the forecasted energy profile of the low carbon energy source.

4. The method of claim 3, wherein the non-facility-specific information further comprises availability of energy from a secondary energy source, and further comprising transferring energy between the facility and the secondary energy source.

5. The method of claim 4, wherein the transferring comprises one of:

(i) exporting energy from the low carbon energy source to the secondary energy source, and (ii) importing energy from the secondary energy source to the facility.

6. The method of claim 1, wherein the forecasted energy profile for the low carbon energy source is received continuously or periodically.

7. The method of claim 6, wherein one or more set points are generated by the ARC each time an update to the energy profile for the low carbon energy source is received.

8. The method of claim 1, further comprising determining if the predicted operating conditions of the facility are outside operating limits of one or more sections or equipment of the facility.

9. The method of claim 8, wherein generating the one or more set points for the facility further comprises:

determining that the predicted operating conditions of the facility are outside the operating limits of one or more sections or equipment of the facility;

determining, in response to the determination that the predicted operating conditions are outside the operating limits, a maximum hydrogen rate using first principle calculations that may be consumed by the ammonia synthesis loop without violating any of the operating limits of any equipment and/or process in the facility; and generating the one or more set points for the facility based on the determined maximum hydrogen rate and on the operating limits of one or more sections or equipment of the facility.

10. A control system for producing ammonia using a low carbon energy source, the ammonia being produced by a facility having an ammonia synthesis loop, the control system comprising:

an advanced regulatory controller (ARC) configured to:

receive a forecasted energy profile for the low carbon energy source over a time period;

predict operating conditions of the facility based on the forecasted energy profile for the low carbon energy source by determining an average amount of available hydrogen over the time period of the forecasted energy profile, and determining the operating conditions of the facility via first principle calculations based on the average amount of available hydrogen; and generate one or more set points for the facility and to control a generation of a hydrogen feed to the ammonia synthesis loop for production of the ammonia, wherein the one or more set points for the facility and to control the generation of hydrogen feed to the ammonia synthesis loop are within operating limits of the facility.

11. The control system of claim 10, wherein the one or more set points are generated based on the received forecasted energy profile for the low carbon energy source.

12. The control system of claim 10, wherein the ARC is further configured to:

receive a level of energy availability from a secondary energy source.

13. The control system of claim 12, wherein the ARC is further configured to:

cause a transfer of energy between the facility and the secondary energy source.

14. The control system of claim 10, wherein the ARC is further configured to:

determine if the predicted operating conditions of the facility are outside operating limits of one or more sections or equipment of the facility;

determine, in response to the determination that the predicted operating conditions of the facility are outside the operating limits, a maximum hydrogen rate that may be consumed by the ammonia synthesis loop without violating any of the operating limits of any equipment and/or process in the facility; and use the maximum hydrogen rate and on the operating limits of one or more sections or equipment of the facility to generate the one or more set points.

15. The control system of claim 10, further comprising one or more distributed control systems configured to receive the one or more set points generated by the ARC.

16. A non-transitory computer readable medium having stored thereon computer-readable instructions that, when executed by a processor, cause the processor to:

receive facility-specific information and non-facility-specific information, wherein the non-facility-specific information comprises a forecasted energy profile for a low carbon energy source over a time period;

predict operating conditions of the facility based on the forecasted energy profile for the low carbon energy source by determining an average amount of available hydrogen over the time period of the forecasted energy profile, and determining the operating conditions of the facility via first principle calculations based on the average amount of available hydrogen;

determine if the predicted operating conditions of the facility are outside operating limits of one or more sections or equipment of the facility;

generate, based on the determination of whether the predicted operating conditions of the facility are outside operating limits, one or more set points for the facility; and control production of ammonia based on the one or more set points.

17. The non-transitory computer readable medium of claim 16, further configured to continuously monitor one or more components of a facility comprising an ammonia synthesis loop and the low carbon energy source.

18. The non-transitory computer readable medium of claim 17, further configured to receive a level of energy availability from a secondary energy source.

19. The non-transitory computer readable medium of claim 18, further configured to cause a transfer of energy from the low carbon energy source to a secondary source of energy.

20. A method for controlling a facility for producing ammonia using a low carbon energy source and an ammonia synthesis loop, comprising:

receiving facility-specific information and non-facility-specific information, wherein the non-facility-specific information comprises a forecasted energy profile for a low carbon energy source over a time period;

predicting operating conditions of the facility based on the forecasted energy profile for the low carbon energy source by determining an average amount of available hydrogen over the time period of the forecasted energy profile, and determining the operating conditions of the facility via first principle calculations based on the average amount of available hydrogen;

determining if the predicted operating conditions of the facility are outside operating limits of one or more sections or equipment of the facility;

generating, based on the determination of whether the predicted operating conditions of the facility are outside operating limits, one or more set points for the facility; and controlling production of ammonia based on the one or more set points.

* * * * *